(12) United States Patent
Jeong

(10) Patent No.: US 10,053,082 B2
(45) Date of Patent: Aug. 21, 2018

(54) CONTROL METHOD OF HYBRID VEHICLE

(71) Applicants: HYUNDAI MOTOR COMPANY, Seoul (KR); KIA MOTORS CORPORATION, Seoul (KR)

(72) Inventor: Won Young Jeong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/372,810

(22) Filed: Dec. 8, 2016

(65) Prior Publication Data

US 2018/0111600 A1    Apr. 26, 2018

(30) Foreign Application Priority Data

Oct. 20, 2016    (KR) .......................... 10-2016-0136562

(51) Int. Cl.
| | |
|---|---|
| *B60L 11/00* | (2006.01) |
| *B60W 20/14* | (2016.01) |
| *B60K 6/20* | (2007.10) |

(52) U.S. Cl.
CPC .............. *B60W 20/14* (2016.01); *B60K 6/20* (2013.01); *B60Y 2200/92* (2013.01); *B60Y 2300/182* (2013.01); *B60Y 2300/18016* (2013.01); *B60Y 2300/18125* (2013.01); *B60Y 2300/244* (2013.01); *B60Y 2300/91* (2013.01); *Y10S 903/903* (2013.01)

(58) Field of Classification Search
USPC ......................................................... 701/22
See application file for complete search history.

(56) References Cited

U.S. PATENT DOCUMENTS

| | | | |
|---|---|---|---|
| 8,655,532 B2 * | 2/2014 | Bhattarai ............ | B60W 50/082 701/22 |
| 2007/0251741 A1 * | 11/2007 | Kidston ................. | B60L 11/14 180/65.29 |

(Continued)

FOREIGN PATENT DOCUMENTS

| | | |
|---|---|---|
| JP | H09-168206 A | 6/1997 |
| JP | 11-164402 A | 6/1999 |

(Continued)

OTHER PUBLICATIONS

Notice of Allowance dated Jun. 1, 2017 of corresponding Korean Patent Application No. 10-2016-0136562—2 pgs.

*Primary Examiner* — Tyler D Paige
(74) *Attorney, Agent, or Firm* — Knobbe Martens Olson & Bear LLP

(57) ABSTRACT

A control method of a hybrid vehicle includes determining, by a controller, whether a target maintaining SOC has been set to a maximum level in a battery maintaining driving mode, determining, by the controller, whether a vehicle speed is equal to or higher than a predetermined speed, when the target maintaining SOC determined is a maximum level, calculating, by the controller, an estimated recovery energy which can be recovered by regenerative braking of the vehicle when a current vehicle speed is equal to or higher than the predetermined speed, and updating, by the controller, the target maintaining SOC by subtracting a subtraction SOC equivalent to the estimated recovery energy calculated from the target maintaining SOC.

4 Claims, 3 Drawing Sheets

(56) References Cited

U.S. PATENT DOCUMENTS

| | | | | |
|---|---|---|---|---|
| 2009/0259363 A1* | 10/2009 | Li | ............ | B60K 6/445 |
| | | | | 701/36 |
| 2014/0229043 A1* | 8/2014 | Frank | ............ | B60W 20/20 |
| | | | | 701/22 |
| 2015/0232082 A1* | 8/2015 | Frank | ............ | B60W 20/10 |
| | | | | 701/22 |
| 2015/0298570 A1* | 10/2015 | Hisano | ............ | B60L 11/1861 |
| | | | | 701/22 |
| 2016/0375789 A1* | 12/2016 | Park | ............ | B60W 20/10 |
| | | | | 701/22 |

FOREIGN PATENT DOCUMENTS

| | | |
|---|---|---|
| JP | 3387313 B2 | 3/2003 |
| JP | 2009-274610 A | 11/2009 |
| JP | 2010-143310 A | 7/2010 |
| JP | 2011-131829 A | 7/2011 |
| JP | 5102101 B2 | 12/2012 |
| KR | 10-2011-0024307 A | 3/2011 |

* cited by examiner

CONTROL METHOD OF HYBRID VEHICLE

CROSS REFERENCE TO RELATED APPLICATION

This application claims the benefit of Korean Patent Application No. 10-2016-0136562, filed on Oct. 20, 2016, entitled "Damping Apparatus of Shifting Cable for Vehicle", which is hereby incorporated by reference in its entirety into this application.

BACKGROUND

1. Field

The present disclosure relates to a control method of a hybrid vehicle, and more particularly, to a technique of controlling a state of charge (SOC) of a hybrid vehicle.

2. Description of the Related Art

A hybrid vehicle has three driving modes, which include an electric vehicle (EV) driving mode (in which the vehicle is driven by a motor using a high voltage battery, a charge driving mode (in which the vehicle is driven by an engine, while charging a battery), and a battery maintaining driving mode (in which the vehicle is driven by the engine and the motor, while maintaining the battery at a predetermined level).

The disclosure of this section is to provide background of the invention. Applicant notes that this section may contain information available before this application. However, by providing this section, Applicant does not admit that any information contained in this section constitutes prior art.

SUMMARY

An aspect of the present invention is to provide a control method of a hybrid vehicle, capable of effectively managing energy of the vehicle by appropriately varying a target maintaining SOC of a battery according to a driving situation of the vehicle in a situation in which a driver designates the target maintaining SOC to a maximum level in a battery maintaining driving mode, thereby enhancing fuel efficiency of the vehicle and increasing a distance over which the vehicle is driven in an electric vehicle (EV) driving mode.

According to an embodiment of the present invention, there is provided a control method of a hybrid vehicle, including: a target level determining operation of determining, by a controller, whether a target maintaining SOC has been set to a maximum level in a battery maintaining driving mode; a middle/high speed determining operation of determining, by the controller, whether a vehicle speed is equal to or higher than a predetermined middle/high vehicle speed, when the target maintaining SOC determined in the target level determining operation is a maximum level; an energy estimating operation of calculating, by the controller, an estimated recovery energy which can be recovered by regenerative braking of the vehicle when a current vehicle speed is equal to or higher than the middle/high vehicle speed according to the result of the middle/high speed determining operation; and a first state of charge (SOC) correcting operation of updating, by the controller, the target maintaining SOC by subtracting a subtraction SOC equivalent to the estimated recovery energy calculated in the energy estimating operation from the target maintaining SOC, wherein the controller manages charging and discharging of the battery according to the updated target maintaining SOC.

In the target level determining operation, when the set target maintaining SOC is smaller than the MAX SOC, a charge control limit SOC, by a predetermined lower extra SOC, it may be determined that the target maintaining SOC has been set to the maximum level.

In the energy estimating operation, the estimated recovery energy may be calculated by multiplying energy conversion efficiency μ to kinetic energy of the vehicle.

The control method may further include: a downtown vehicle speed determining operation of determining, by the controller, whether the vehicle speed is equal to or lower than a predetermined downtown vehicle speed when it is determined that the set target maintaining SOC is not a maximum level according to a result of performing the target level determining operation; and a second SOC correcting operation of updating. by the controller, the maintaining target SOC by adding a predetermined additional SOC to the target maintaining SOC when the vehicle speed is equal to or lower than the downtown vehicle speed according to a result of performing the downtown vehicle speed determining operation.

DESCRIPTION OF THE EMBODIMENTS

In embodiments, a hybrid vehicle can operates in the battery maintaining driving mode, which is one of various driving modes. In the battery maintaining driving mode, an SOC of a battery designated by a driver is maintained. The driver designates the SOC of the battery to a maximum level (MAX SOC (a charge control limit SOC)=90%, for example). In this circumstance, when an actual SOC of the battery reaches the maximum level, a charge limit is entered to protect the battery. In this state, driving energy of the vehicle is not possible to recover in regenerative braking, and even in a situation in which the engine is driven so charging is available, since it is impossible to charge the battery, the vehicle is to be driven by lowering power of the engine. The engine is operated at an engine driving point with low efficiency, resulting in a reduction in fuel efficiency of the vehicle, compared with a case in which a target maintaining SOC is set by the driver to be lower than the maximum level SOC.

Figure 4:
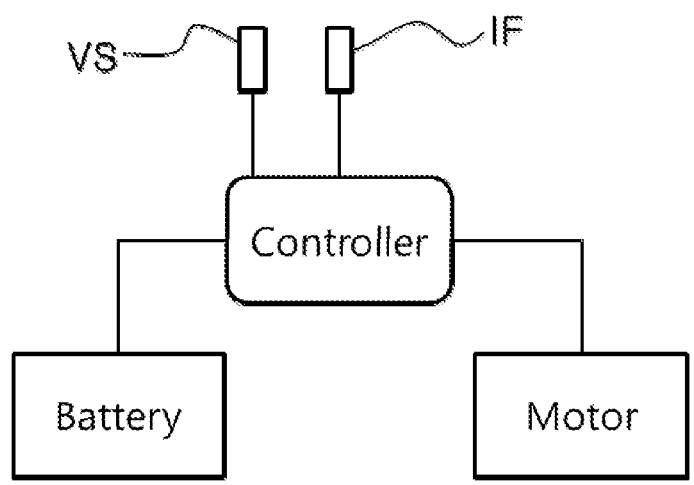
FIG. 4 is a block diagram of major components of a vehicle to which an embodiment of the present invention is applicable.

FIG. 4 is a view illustrating major components of a hybrid vehicle to which embodiments of the present invention is applicable, in which a motor providing driving force of a vehicle, a battery providing electricity to the motor, and a controller controlling the battery and the motor are illustrated and an engine constituting the hybrid vehicle, a power connection structure of the engine and the motor, and the like, are omitted.

A vehicle speed sensor (VS) and an interface device (IF) allowing a driver to set a desired target maintaining SOC are connected to the controller.

Figure 1:
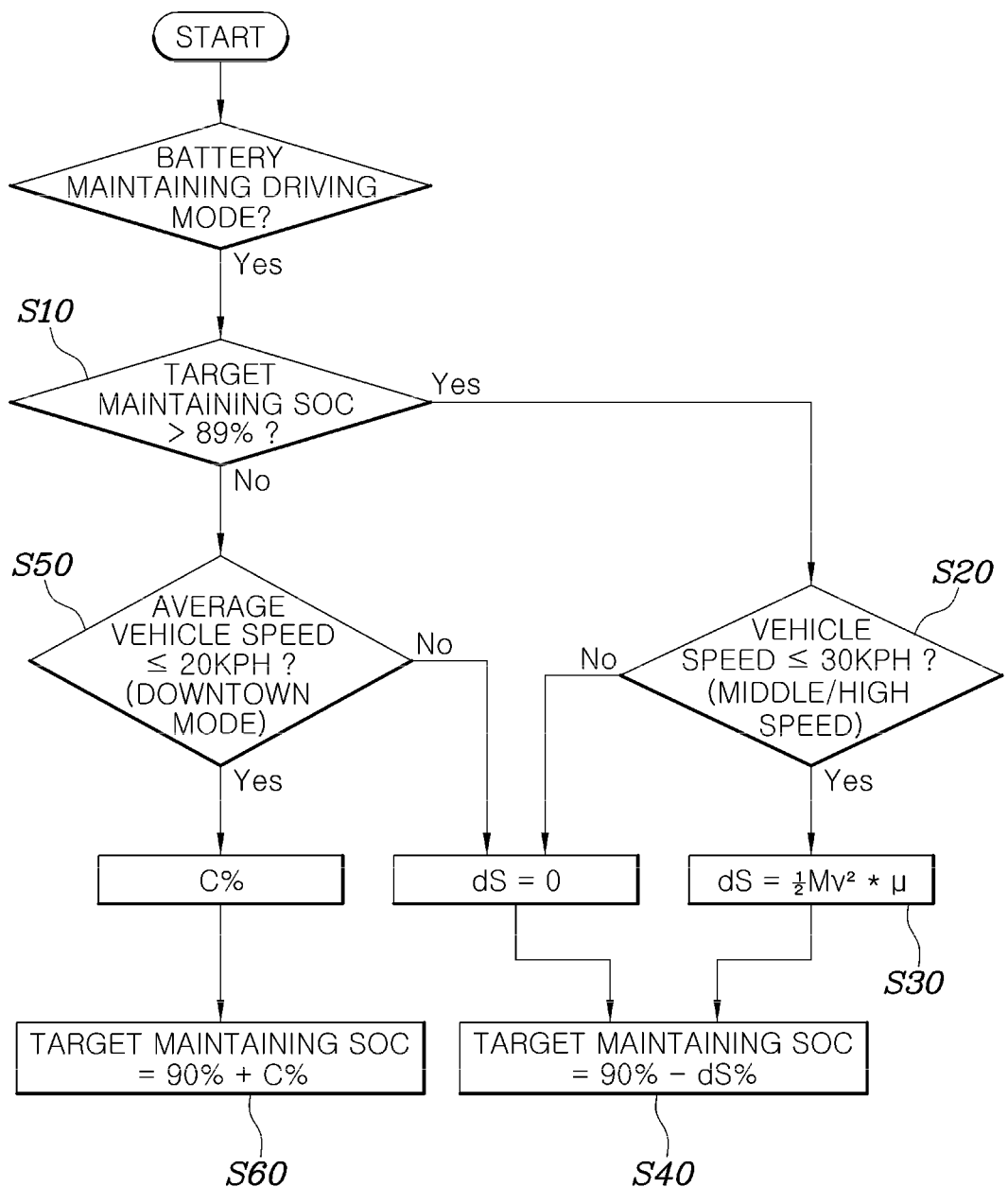
FIG. 1 is a flow chart illustrating a control method of a hybrid vehicle according to an embodiment of the present invention.
Figure 2:
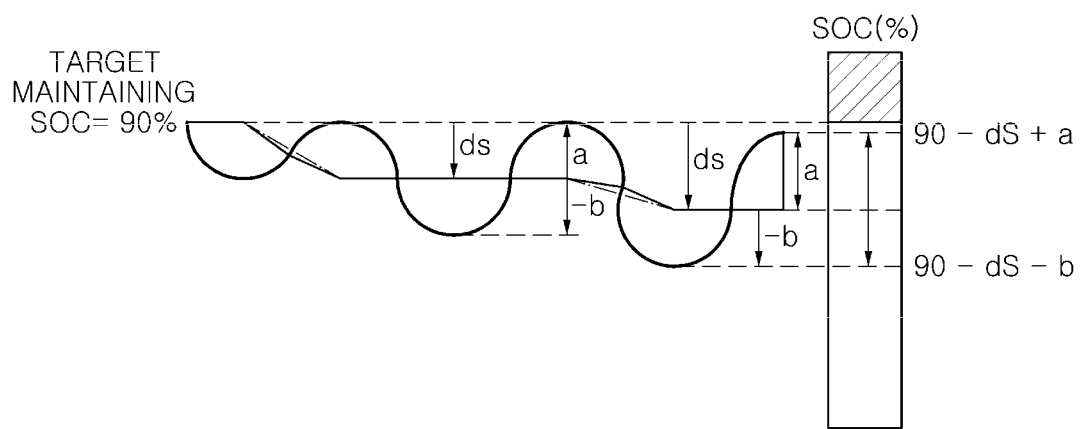
FIG. 2 is a view illustrating performing of a first state of charge (SOC) correction operation according to the embodiment of the present invention.
Figure 3:
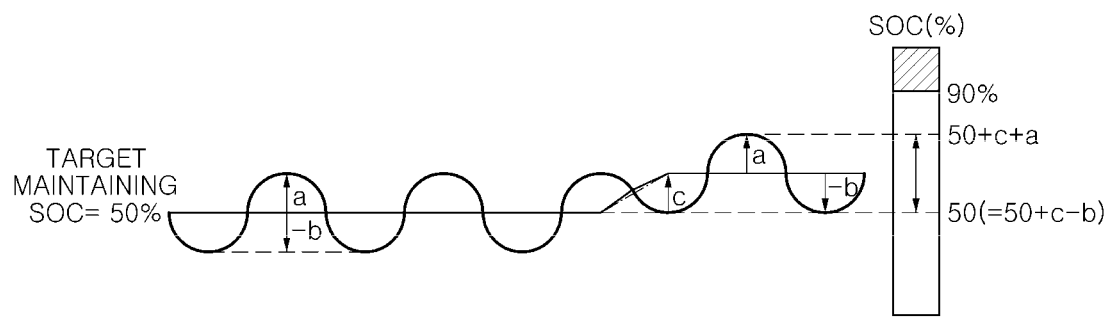
FIG. 3 is a view illustrating performing of a second SOC correction operation according to the embodiment of the present invention.

Referring to FIGS. 1 to 3, a control method of a hybrid vehicle according to an embodiment of the present invention includes a target level determining operation S10 of determining whether a target maintaining SOC has been set to a maximum level in a battery maintaining driving mode; a middle/high speed determining operation S20 of determining whether a vehicle speed is equal to or higher than a predetermined middle/high vehicle speed, when the target maintaining SOC determined in the target level determining operation S10 is a maximum level; an energy estimating operation S30 of calculating an estimated recovery energy which can be recovered by regenerative braking of the vehicle when a current vehicle speed is equal to or higher than the middle/high vehicle speed according to the result of the middle/high speed determining operation S20; and a first state of charge (SOC) correcting operation S40 of updating the target maintaining SOC by subtracting a subtraction SOC equivalent to the estimated recovery energy calculated in the energy estimating operation S30 from the target maintaining SOC. In an embodiment, the maximum level is 70%, 73%, 75%, 78%, 82%, 84%, 86%, 87%, 88%, 89%, 90%, 92% or 94% of the maximum SOC of the battery. In another embodiment, the maximum level is in a range formed by two numbers selected from those listed above. In other embodiments, when the driver sets a number within a range formed by two numbers selected from those listed in the above, the controller determines that the driver sets the maximum level.

In embodiments, in a state in which a driver sets the target maintaining SOC to the maximum level, if a vehicle speed is equal to or higher than the middle/high vehicle speed so at least a charge amount equivalent to the estimated recovery energy is calculated to be secured until the vehicle stops, the target maintaining SOC is updated by subtracting the subtraction SOC therefrom, thus preventing a situation in which the SOC of the battery enters a charge control limit in actuality to control the engine by an operating point with low efficiency, in advance, whereby an SOC state at a level required by the driver may be fundamentally secured, while enhancing fuel efficiency of the vehicle.

In the target level determining operation S10, when the set target maintaining SOC is smaller than the MAX SOC, a charge control limit SOC, by a predetermined lower extra SOC, preferably, it is determined that the target maintaining SOC has been set to the maximum level.

In embodiments, in a case in which the MAX SOC is 90%, the lower extra SOC may be determined to 2 to 3%, or the like. Thus, when the target maintaining SOC set by the driver is 89%, for example, as illustrated in FIG. 1, it is determined that the target maintaining SOC has been set to the maximum level in the target level determining operation S10.

This is to apply embodiments of the present invention to a case in which, although the driver has not accurately set to the target maintaining SOC to a value equal to or higher than the MAX SOC but the target maintaining SOC is close thereto so the driver should drive the engine at a driving point with low efficiency as mentioned above.

Thus, the lower extra SOC may be determined by design through experimentation and interpretation according to the aforementioned purpose.

For reference, the MAX SOC, a charge control limit SOC, is set to 90% in the present embodiment, but it refers to an SOC which is set to limit charge to protect a battery and may be changed according to a battery and a battery management policy.

In the middle/high speed determining operation S20, the middle/high vehicle speed may be set to 30 KPH, for example, at which meaningful regenerative braking energy is able to be secured, which may be appropriately set by design.

In the energy estimating operation S30, the estimated recovery energy is calculated by multiplying energy conversion efficiency p to kinetic energy of the vehicle.

Here, the energy conversion efficiency p refers to conversion efficiency when kinetic energy determined by a mass and a speed of a vehicle is converted into an electrical charge amount of a battery due to a regenerative braking operation of a corresponding vehicle. The energy conversion efficiency p is substantially a value less than 80% and varied according to regenerative braking capability of the corresponding vehicle.

For reference, in FIG. 1, M denotes a vehicle mass and v denotes a vehicle speed.

Meanwhile, in embodiments of the present invention, the control method may further include a downtown vehicle speed determining operation S50 of determining whether the vehicle speed is equal to or lower than a predetermined downtown vehicle speed when it is determined that the set target maintaining SOC is not a maximum level according to a result of performing the target level determining operation S10; and a second SOC correcting operation S60 of updating the maintaining target SOC by adding a predetermined additional SOC to the target maintaining SOC when the vehicle speed is equal to or lower than the downtown vehicle speed according to a result of performing the downtown vehicle speed determining operation S50.

Here, the downtown vehicle speed refers to an average vehicle speed when the vehicle is driving in a downtown area requiring frequent acceleration and deceleration. The downtown vehicle speed represents a driving state in which a large amount of SOC of the battery is consumed. For example, the downtown vehicle speed may be set to 20 KPH, or the like, but may also be changed by design.

In embodiments, in the downtown vehicle speed determining operation S50 and the second SOC correcting operation S60, when the vehicle drives at a speed equal to or lower than the downtown vehicle speed in a situation in which the target maintaining SOC set by the driver is not the maximum level, a probability that the SOC of the battery is easily consumed due to frequent repetition of acceleration and deceleration at the low vehicle speed, compared with a general case, is higher than a probability in which energy is recovered substantially through regenerative braking. Thus, in this situation, a new target maintaining SOC is set by adding the additional SOC to the target maintaining SOC set by the driver and the SOC of the battery is managed accordingly, whereby a distance driven substantially in the EV driving mode is relatively increased and battery discharge in the downtown area is restrained at an initial stage.

Here, the additional SOC may be set to a predetermined value such as 5% or 10%, for example.

For reference, FIG. 2 illustrates an example in which the MAX SOC is 90%, a target maintaining SOC set by the driver is 90%, and an SOC of the battery is managed to target maintaining SOC lowered by the subtraction SOC in the first SOC correcting operation S40 of the present discourse with the passage of time from the left to the right, in which the subtraction SOC is increased with the passage of time, which means that the vehicle speed is increased as much.

Here, a and b refer to an allowable upper limit and an allowable lower limit of the SOC that may be changed with respect to the target maintaining SOC, respectively.

Also, for reference, the estimated recovery energy is denoted by dS and the subtraction SOC obtained by converting the estimated recovery energy into SOC is simply denoted by dS %.

FIG. 3 is a view illustrating a case in which the second SOC correcting operation S60 is performed as a vehicle speed is lower than the downtown vehicle speed in a situation in which the target maintaining SOC set by the driver is 50%. In embodiments, charging/discharging the battery is managed by the new target maintaining SOC greater than 50% by adding the additional SOC (c) to the target maintaining SOC.

As described above, with the control method of a hybrid vehicle according to the embodiment of the present invention, in a situation in which the driver sets the target maintaining SOC of the battery to the maximum level in the battery maintaining driving mode, the target maintaining SOC is appropriately varied according to a driving situation of the vehicle to effectively manage energy of the vehicle, whereby fuel efficiency of the vehicle may be enhanced and a distance over which the vehicle may drive in the EV driving mode may be increased.

In embodiments, a method of adjusting a target level of a state of charge (SOC) in a hybrid vehicle includes: (a) receiving a driver's target SOC level and (b) setting the driver's target SOC level as the target level. The method further includes: (c) determining, by a controller, whether the driver's target SOC level is in a predetermined range (e.g., 80% to 90% of the maximum SOC of the vehicle's battery) when the vehicle is driving by the operation of an engine and a motor while maintaining a charge level of the vehicle's battery; (d) determining, by the controller, whether a vehicle speed is equal to or higher than a predetermined vehicle speed when determined that the driver's target SOC is in the predetermined range; (e) estimating, by the controller, a recovery energy which can be recovered by regenerative braking of the vehicle when determined that the current vehicle speed is equal to or higher than the predetermined vehicle speed; (f) calculating an updated target SOC level by subtracting a subtraction SOC equivalent to the estimated recovery energy from the driver's target SOC level; (g) overriding the driver's target SOC level and setting, by the controller, the updated target SOC level as the target level such that the controller manages charging and discharging of the battery based on the updated target SOC level. In one embodiment, after a predetermined time period since the target level is replaced with the updated target SOC level, the steps (d), (e), (f) and (g) repeat to further update the target level. Further, when determined that the vehicle speed is smaller than the predetermined speed once updating the target level, the driver's target SOC level is set as the target level.

In one embodiment, once the updated target SOC level is set, a fuel engine of the hybrid vehicle stops (e.g., becomes off and/or maintains off) for a preset time period. Fuel, e.g., gasoline, is not consumed for the preset time period. In another embodiment, the engine stops its operation until the current SOC level reaches a predetermined amount. In embodiments, the predetermined amount is 102%, 103%, 104%, 105%, 107%, 108% and 110% of the updated target SOC level. In embodiments, the predetermined amount is in a range formed by any two numbers selected from those listed in the above. In embodiments, the engine stops its operation until detecting the driver's request for quick acceleration. The driver's request is, e.g., deep pressing of an acceleration pedal beyond a certain degree.

In embodiments, the controller includes one or more processors for performing to perform various steps discussed above and one or more memories for storing programs and data discussed above.

Although embodiments of the present invention have been shown and described, it will be obvious to those skilled in the art that the present invention may be variously modified and altered without departing from the spirit and scope of the present invention as defined by the following claims.

What is claimed is:

1. A control method of a hybrid vehicle, the control method comprising:
   a target level determining operation of determining, by a controller, whether a target state of charge (target SOC) has been set to a maximum level;
   a middle/high speed determining operation of determining, by the controller, whether a current speed of the vehicle is equal to or higher than a first predetermined vehicle speed, when the target SOC is set to the maximum level;
   an energy estimating operation of calculating, by the controller, an estimated recovery energy which can be recovered by regenerative braking of the vehicle when the current speed of the vehicle is equal to or higher than the first predetermined vehicle speed; and
   a first state of charge (SOC) correcting operation of updating, by the controller, the target SOC by subtracting a subtraction value equivalent to the estimated recovery energy from the target maintaining SOC,
   wherein the controller manages charging and discharging of the battery according to the updated target SOC.

2. The control method of a hybrid vehicle of claim 1, wherein, in the target level determining operation, when the target SOC is smaller than a charge control limit SOC (MAX SOC), by a predetermined difference, it is determined that the target SOC has been set to the maximum level.

3. The control method of a hybrid vehicle of claim 1, wherein, in the energy estimating operation, the estimated recovery energy is calculated by multiplying energy conversion efficiency μ to kinetic energy of the vehicle.

4. The control method of a hybrid vehicle of claim 1, further comprising:
   a vehicle speed determining operation of determining, by the controller, whether the current speed of the vehicle is equal to or lower than a second predetermined vehicle speed that is lower than the first predetermined vehicle speed when it is determined that the target SOC has not been set to the maximum level; and
   a second SOC correcting operation of updating, by the controller, the target SOC by adding a predetermined value to the target SOC when the current speed of the vehicle is equal to or lower than the second predetermined vehicle.

* * * * *